July 10, 1928.
A. R. HUETTIG
GAS METER
Filed May 29, 1924
1,676,651
2 Sheets-Sheet 1
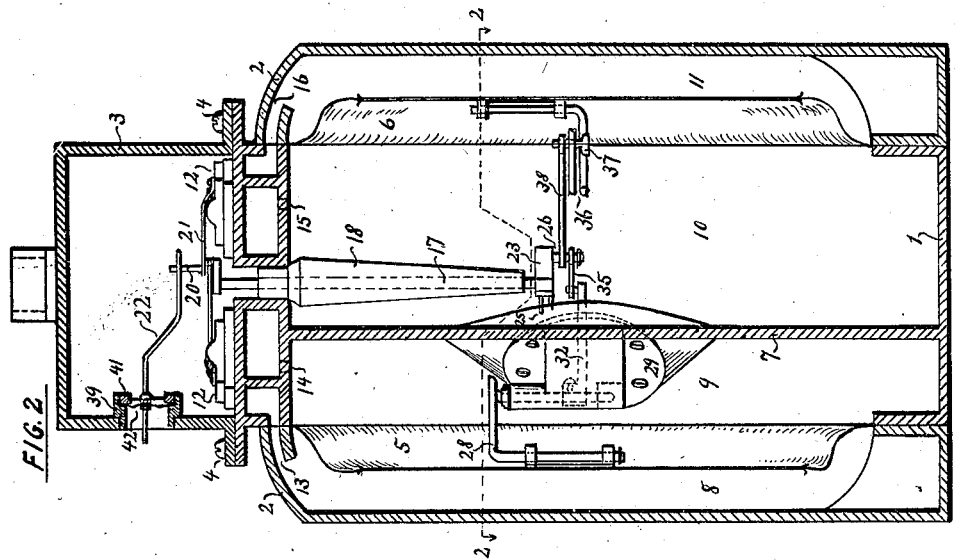
Inventor.
Arno R. Huettig July 10, 1928.
A. R. HUETTIG
GAS METER
Filed May 29, 1924
1,676,651
2 Sheets-Sheet 2
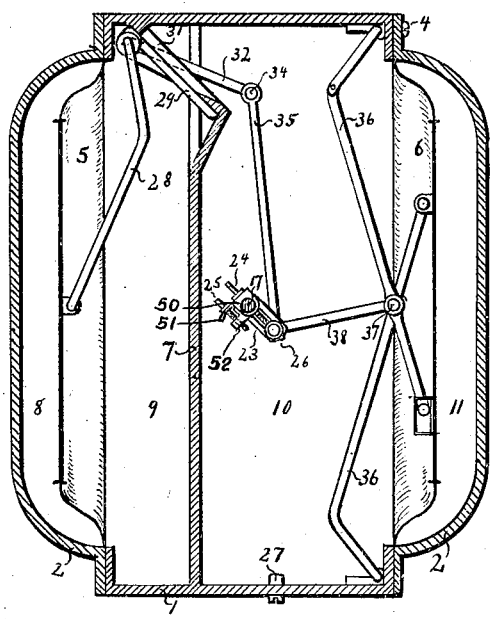
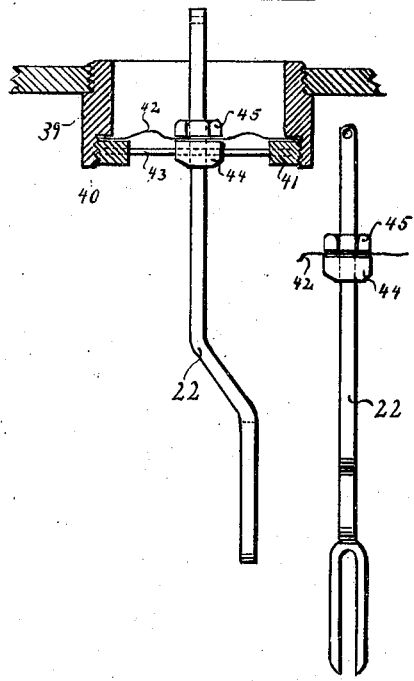
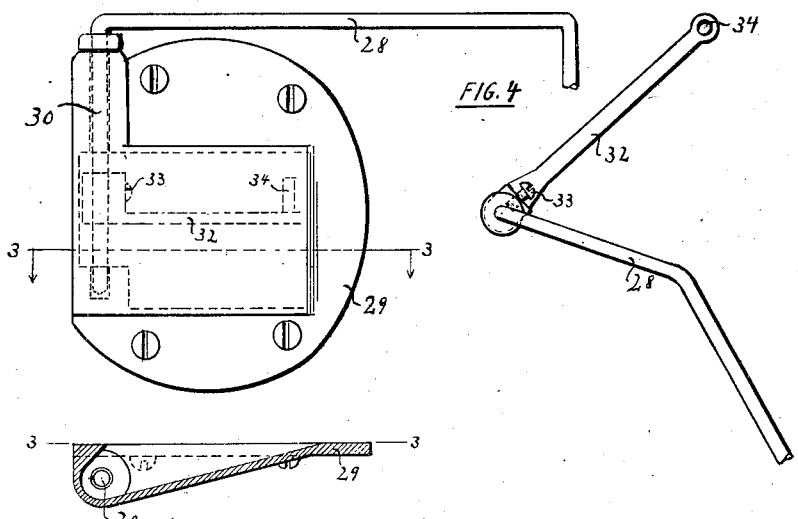
Inventor
Arno R. Huettig Patented July 10, 1928.

1,676,651

UNITED STATES PATENT OFFICE.

ARNO R. HUETTIG, OF STRATFORD, CONNECTICUT, ASSIGNOR TO AMERICAN METER COMPANY, INCORPORATED, OF NEW YORK, N. Y., A CORPORATION OF DELAWARE.

GAS METER.

Application filed May 29, 1924. Serial No. 716,694.

My invention relates to an improvement in gas meters more particularly of the type in which the body member or casing is advantageously made of cast metal and divided by means of a suitable partition and co-acting diaphragms into four measuring chambers, as distinguished from the general class of meters in which only three measuring chambers are provided, although it is obvious that my invention may be applied to meters of any other appropriate type or style. In some respects, the construction hereinafter to be described is equivalent in operation to the meter construction described and illustrated in my copending application, Serial No. 695,725, filed February 28, 1924. One object of the present invention has been to provide apparatus which will in general present the advantageous features of operation set forth with respect to the construction disclosed in said previous application, at the same time presenting features of construction which will for some purposes be preferred to those previously disclosed. For example, in my application aforesaid, I have described and shown a partition, part of which comprises a flexible member through which the thrust of one of the diaphragms is transmitted to the crank shaft. My present construction permits the use of a rigid partition of relatively simple contour without detriment to the accurate and effective operation of the meter. Moreover, according to my present invention, the construction and assembly of the meter is somewhat simplified and it can therefore be produced and repaired quickly and at a relatively low cost.

A further object of the present invention has been to provide improved means for transmitting the movement of the crank shaft to the indicating and recording mechanism with a minimum of friction and in such a manner as to insure accurate performance of the apparatus.

A further object has been to provide novel and relatively simple means for adjusting the angular relation between the power transmitting crank arm and the power receiving crank arm, or the upper and lower cranks, respectively, on the crank shaft, and also novel and simple means for simultaneously adjusting the extent of movement of both diaphragms.

One embodiment of my invention is illustrated in the drawings accompanying the present specification, and in which:

Figure 1 is a front elevation with one cover removed and one diaphragm indicated in dotted lines, Figure 2, a central vertical section, Figure 3, a horizontal section on the line 2—2 of Fig. 2, Figure 4, enlarged detail views illustrating diaphragm supporting mechanism and its relation to the vertical partition, and Figure 5, enlarged detail views illustrating the construction and assembly of the index operating mechanism.

Referring to the drawings, the body member of the meter includes a central casing 1 provided with covers 2. A top cap 3 is secured to the central casing 1 by means of screws 4. Diaphragms 5 and 6 are secured in operative position with their outer edges clamped between the respective covers 2 and adjacent portions of the casing 1. A vertically disposed partition 7, preferably cast integral with the central casing divides the body member into two chambers which are in turn divided by the diaphragms 5 and 6 respectively, thus forming in effect four separate measuring chambers 8, 9, 10, and 11. Valves 12 cooperate with openings in the top wall of the casing 1 to control the flow of gas from the chamber formed by the top cap into said measuring chambers and from the measuring chambers outward through a discharge port, not shown. The inlet ports are indicated at 13, 14, 15, and 16. A vertically disposed crank shaft 17 is mounted on a support 18 and passes through an air-tight passage therein. The upper end of said support engages and closes an opening in the top wall of the central casing and thereby prevents the passage of gas through said opening. At the upper end of the crank shaft 17 is a power transmitting crank arm 19 provided with a pin 20, said pin being operatively connected to the valves 12 by means of links 21. The pin 20 is also positioned to engage a slot in the forked end of an index or indicator actuating lever 22 for the purpose of imparting rocking motion thereto in a horizontal direction. As indicated in Figure 5, a threaded cylinder 39 is mounted in a wall of the top cap 3. At the inner end of said cylinder, a threaded annular recess 40 receives a threaded ring 41. A flexible disc 42 of leather or other suitable pliable or flexible material is assembled with its peripheral edges clamped between one face of the ring 41 and a shoulder formed in the cylinder 39 at the bottom of the recess 40. The lever 22 extends centrally through the opening of ring 41 and cylinder 39 and is pivotally supported in the ring 41 by means of a transversely extending cross pin or pivot 43 having its ends journaled in said ring 41. The free or index engaging end of the lever 22 extends through a central opening in the flexible disc 42 and leakage of gas through said opening is prevented by suitable fastening or closure means such as an annular flange 44 on said lever 22 at one side of disc 42 and a nut 45 cooperating with said annular flange for the purpose of pressing the central portion of the disc adjacent said opening tightly against said flange. In operation, it will be apparent that the pin 20, in its movement of rotation resulting from the rotation of shaft 17, will impart a rocking movement to the lever 22 so that the free or outer end thereof will have a similar movement, said outer end being positioned to operatively engage index or indicator means in any well known manner.

Referring to Figures 3 and 4 an arm 28 supporting diaphragm 5 and swinging in chamber 9 is journaled in a bearing 30 of bracket 29, said bearing being rendered air or gas tight by suitable means without interfering with free turning of the supporting arm 28 therein. A portion of the lower or bearing end of the supporting arm 28, after passing through the bearing 30, is exposed on the opposite side of the partition 7 or in chamber 10 through an opening 31 in said partition, thus making it possible to attach to said lower end of the supporting arm 28 a lever arm or bar member 32, by any suitable means such as a set screw 33, Fig. 4, thus forming in effect a double arm or bell crank lever having one arm 28 at one side of the partition and the other arm or bar member 32 at the opposite side thereof and operating entirely within the chamber 10. The diaphragm 6 may conveniently be supported by means of arms 36 journaled in suitable brackets within the chamber 10 and pivotally connected at 37. As indicated in Fig. 2, the crank shaft 17 is provided with a slotted crank 23 having means for slidably supporting and engaging a crank pin 26 by means of which both diaphragms are connected to said crank arm 23 by means of the links 35 and 38 respectively. A screw rod 24 is arranged longitudinally with respect to the slot in crank arm 23 and engages and actuates the pin 26 for the purpose of adjusting the same and retaining it in any desired position of adjustment along the crank arm 23. As indicated in Fig. 3, a yoke 50 spans one end of the crank arm 23 and is provided with a forked lug 51. One end of a screw rod 25 is threaded in a lug 52 secured to the shaft 17, the other end thereof engaging the slot in the forked end of lug 51. Thus, when screw rod 25 is rotated, the shaft 17 is also rotated by a corresponding amount and to that extent changes the annular position of crank arm 23 with respect to crank arm 19. When the screw rods 24 and 25 are in suitable position, they are readily accessible for manipulation by means of a proper tool which can readily be inserted through an opening in the wall of the casing 1, said opening being normally closed by means of a plug 27.

In operation, the reciprocating movement of the diaphragm 5 will be transmitted through supporting arm 28, bar member 32 and link 35 to the crank arm 23 while the reciprocatory movement of diaphragm 6 will be transmitted from the supporting arms 36 through link 38 to said crank arm 23, both links being connected to said arm by the same pin, and being therefore to that extent concentrically pivoted on said arm. It will be apparent that my improved construction presents a simple and effective power transmitting mechanism for meters and one in which all necessary adjustments can be made without dismantling the whole structure.

I claim as my invention:

1. A meter comprising a body member having a partition, a diaphragm at one side of said partition, a crank shaft at the other side of said partition, a bell crank lever operatively connecting said diaphragm with said crank shaft, one arm of said lever being located at one side of said partition and the other arm of said lever being located at the opposite side thereof.

2. In a meter, a casing, a pair of diaphragms therein, arms for supporting said diaphragms, a transverse partition in said casing between said diaphragms, said partition having an opening in a vertically disposed portion thereof, a cover for said opening, a bracket on one side of said cover and a recess on the opposite side, one of said supporting arms having one end engaging one of said diaphragms and the other end pivotally engaging said bracket and exposed in said recess, a bar member secured to said exposed end portion of the first mentioned supporting arm, a vertical crank shaft, a link connection between said crank shaft and said bar member, and a second link connection between said crank shaft and the other of said supporting arms.

3. In a meter, a casing, a pair of diaphragms therein, a transverse partition in said casing between said diaphragms, a pair of arms at one side of said partition for supporting one of said diaphragms, a single arm at the other side of said partition having one end supporting the other diaphragm and the other end extending through said partition, a crank shaft, a link connecting said crank shaft with said pair of arms, and means operatively connecting said crank shaft with said other end of the single arm.

In testimony whereof I affix my signature.

ARNO R. HUETTIG.